United States Patent [19]
Schmidt

[11] 3,761,998
[45] Oct. 2, 1973

[54] SHACKLE TENSIONING DEVICE
[75] Inventor: William C. Schmidt, Cincinnati, Ohio
[73] Assignee: The Cincinnati Butchers Supply Company, Cincinnati, Ohio
[22] Filed: Oct. 18, 1971
[21] Appl. No.: 190,105

[52] U.S. Cl. .................................................. 17/24
[51] Int. Cl............................................. A22b 5/00
[58] Field of Search ....................................... 17/24

[56] References Cited
UNITED STATES PATENTS
2,882,551   4/1959   Reich..................................... 17/14

Primary Examiner—Robert Peshock
Attorney—J. Warren Kinney, Jr.

[57] ABSTRACT

In an automated meat processing plant, the invention consists in automatically holding in tension a shackle applied to one leg of a stunned meat animal, while the animal moves from the stunning station to a bleeding rail, so that the shackle may not slacken and detach itself accidentally from the animal's leg and thereby expose an attendant to uncontrolled dangerous leg reflexes of the stunned animal.

22 Claims, 6 Drawing Figures

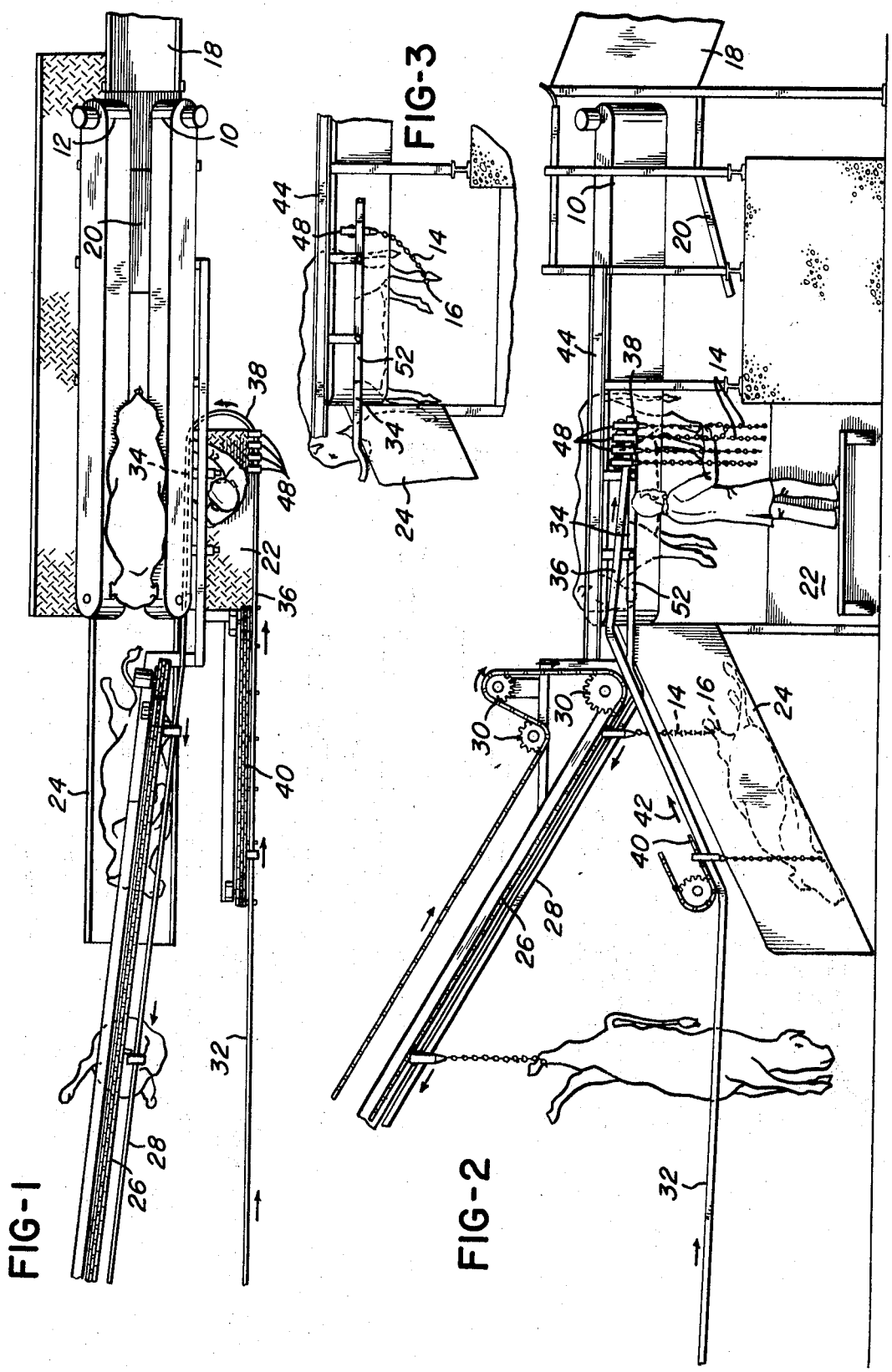

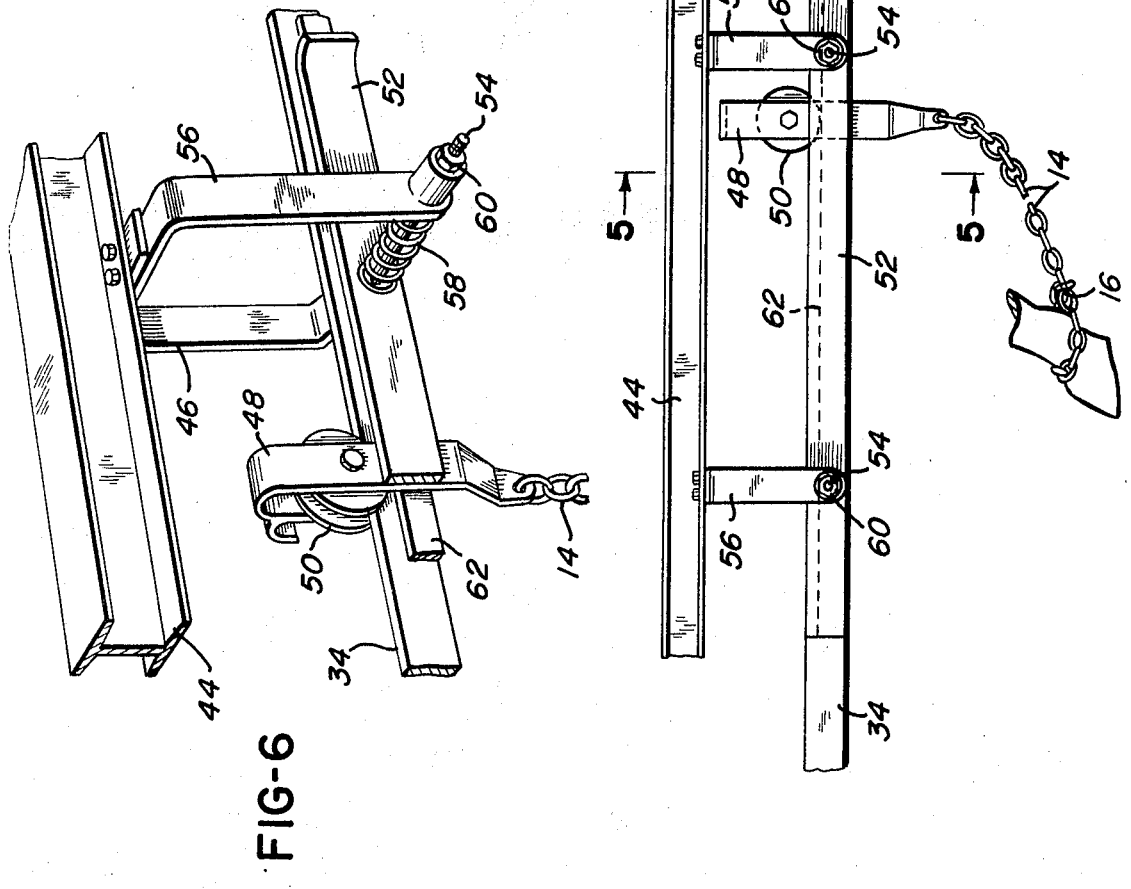

SHACKLE TENSIONING DEVICE

BACKGROUND OF THE INVENTION

It has been common practice in automated meat packing plants to direct a meat animal on foot to a restraining conveyor which suspends the animal by its sides, leaving the legs freely pendent beneath the conveyor so that an attendant might apply to one hind leg of the animal a chain shackle, usually incorporating a loop, noose, or snare encompassing the leg near the hoof. The shackle usually is applied after the animal has been stunned while restrained in the conveyor.

After application of the shackle, the animal leaves the restraining conveyor and is lifted by means of the shackle to an elevated bleeding position upon a bleeding rail. It is extremely important to the safety and efficiency of the procedure, that the shackle retains a secure hold upon the leg of the animal, for otherwise, the animal may drop to the floor and injure workmen in the vicinity, or at least interfere with orderly operation of the packing plant.

SUMMARY OF THE INVENTION

According to the present invention, means is provided to eliminate slack in the shackle chain as soon as the shackle has been applied to the hind leg of a stunned animal. The purpose of this is to minimize the possibility of the shackle becoming detached or displaced before or during hoisting of the animal carcass to the bleeding rail. By this means, accidents resulting from failure of the shackle to securely suspend the carcass, are effectively prevented.

The invention embodies a shackle tensioning device or means, which automatically removes slack from the shackle chain after application thereof to the animal's hind leg, by reason of advancement of the carcass while a trailing end of the chain is held yieldingly in restraint of advancement with the carcass. The tensioning device operates automatically to release the applied shackle for bodily advancement with the carcass, once the slack has been removed from the shackle chain. The slack is removed by the application of frictional drag to the trolley portion of the shackle, while that end of the shackle which is attached to the carcass advances relatively to the trolley portion of the shackle.

BRIEF DESCRIPTION OF THE DRAWINGS

FIG. 1 is a top plan view of a restraining conveyor and bleeding rail assembly, with the shackle tensioning device of the present invention incorporated therein.

FIG. 2 is a side elevational view of FIG. 1.

FIG. 3 is a detailed side elevation showing a shackle attached to one hind leg of a stunned animal, the shackle chain being held taut by the means of this invention.

FIG. 4 is a view similar to FIG. 3, showing the shackle tensioning device in greater detail.

FIG. 5 is an enlarged cross-section taken on line 5—5 of FIG. 4.

FIG. 6 is a perspective view of a portion of FIG. 4.

DESCRIPTION OF THE PREFERRED EMBODIMENT

In the drawing, the numerals 10, 12 indicate endless belt conveyors with the inner reaches thereof arranged in spaced parallelism and in the form of a "V" to support the sides of an animal according to FIG. 3, so that one end of a shackle chain 14 may be applied by an attendant to the hind leg of the animal as by means of a loop, noose or snare at 16. The conveyors 10, 12 are arranged to receive animals in succession directed thereto on foot by way of an entrance walkway 18, which is stationary in the example illustrated, and constitutes a loading station.

It will be noted that the conveyors 10, 12 are driven at equal rates of speed to move the animals head-first away from walkway 18, as the animals lose footing upon the walkway incline 20. The conveyor reaches are spaced apart at the bottom of the "V" formation, to permit a free dependency of the animal's four legs beneath the conveyor, so that an attendant at the shackling station 22 may stun the animal and conveniently and quickly apply the shackles.

The conveyor 10, 12 is commonly known as an animal restraining conveyor, for obvious reasons. The restraining conveyor is adapted at its terminal end to deliver a stunned animal onto an inclined chute 24, where the animal falls upon its side and is subsequently lifted by means of its shackled leg, to a vertical position as shown at the left in FIG. 2. The shackle of the animal discharged onto chute 24 is picked up by a hook or lug on the inclined forwarding conveyor chain 26 which leads to an elevated sticking and bleeding rail generally forming part of equipment such as that herein disclosed. The inclined rail 28 paralleling the lower reach of conveyor chain 26, may be considered a portion of the sticking and bleeding rail. Chain 26 may be supported upon a group of sprockets 30, according to common practice.

A shackle conveyor rail is shown at 32, the purpose of which is to return empty shackles from a remote station of the animal conveyor system to the shackling station 22. The shackle return rail may include a dead rail section 34 onto which the shackles are fed by way of a sloping gravity rail section 36 which is connected to the dead rail section at a loop 38. Empty shackles from rail 32 may be elevated onto the gravity rail section 36 by means of a continuously operating shackle pickup conveyor 40, which may be constituted of an endless chain driven in the direction of arrow 42. By this means, the attendant at station 22 may be supplied with empty shackles at all times, standing at rest upon dead rail 34 in close proximity to the legs of animals advanced by the restraining conveyor.

As is best illustrated by FIGS. 4, 5 and 6, the dead rail section 34 may be suspended from a stationary horizontal beam 44 which parallels the restraining conveyor. One or more hanger arms 46 fixed to the beam and to rail 34 may provide the necessary suspension means.

Each shackle comprises, in addition to chain 14, a trolley harp or carriage member 48 upon which is rotatably mounted a flanged trolley wheel 50 which rides upon the rail sections 32, 34, 36 and 28, as well as upon other sections of the animal conveying rail system. The carriage member 48 depends in close proximity to rail 34, and extends beneath the level of said rail for attachment to shackle chain 14.

Friction brake means is provided for the purpose of imposing a drag yieldingly resisting advancement of the trolley assembly lengthwise of rail 34 in the direction of advancement of the animal on conveyor 10, 12. Such friction means may include an elongate brake or pressure bar 52 supported so as to yieldingly frictionally engage a portion of carriage 48 while the carriage rests upon or moves along a portion of rail 34.

Pressure bar 52 may carry one or more screw-threaded fixed studs 54, 54 each receiving support from a fixed hanger 56, the studs being each surrounded by a compression spring 58 maintained under stress by an adjustable member or nut 60. For the purpose, spring 58 may be interposed between the hanger 56 and pressure bar 52, FIG. 5., so as to yieldingly press the bar toward one face of rail 34, with a force determinable by an operator of the apparatus.

Rail 34 may be provided with a fixed elongate friction bar or strip 62 against which the carriage may be pressed by bar 52 and spring 58, to provide for smooth and noiseless advancement of the carriage along rail 34. Friction strip 62 may serve also as a wear strip, and may be replaced from time to time as required.

From the foregoing, it will be understood that a shackle is always at hand upon either or both of the dead rails 36 or 34, and may be grasped by an attendant at shackle station 22 for instant application to a hind leg of an animal advancing along restraining conveyor 10, 12.

By the time a shackle is properly fitted to the leg of the advancing animal by the attendant, the carriage portion of said shackle will be in position to enter the tensioning device. Upon entry into the tensioning device between friction bars 52 and 62, the carriage will be frictionally braked thereby and will therefore remain stationary upon rail 34 until the slack in chain 14 is removed incident to advancement of the animal and the looped end 16 of the shackle chain. The resultant tensioning of the shackle chain persists as long as the carriage 48 is restrained by the tensioning device, which continues to brake the carriage even after the animal has been discharged onto chute or support member 24.

By the time carriage 48 leaves the tensioning device, the animal will have begun its ascent on the inclined conveyor 26, with the shackle chain of course still under substantial tension. At no time will the shackle chain be relieved of tension or allowed to slacken, once it has been drawn taut at the shackling station 22. Accordingly, an accidental detachment of any shackle properly applied, is effectively precluded by the means of the present invention.

What is claimed is:

1. The combination which comprises: an animal restraining conveyor for advancing a meat animal from a loading station toward a forwarding conveyor, said restraining conveyor including means to expose at a shackling station at least one hind leg of the animal conveyed thereby; a supply of flexible shackles at the shackling station for application to the exposed hind leg of the animal being advanced by the restraining conveyor; rail supporting said shackles for advancement in the direction of advancement of said animal; and means on said shackle supporting means for tensioning an applied shackle incident to advancement of the animal toward the forwarding conveyor.

2. The combination as defined by claim 1, wherein said tensioning means is operative to maintain tension on the shackle to take up slack therein, from approximately the time of application of the shackle until transfer of the shackled animal and the full weight thereof to the forwarding conveyor.

3. The combination as defined by claim 1, wherein said tensioning means comprises friction brake means operative upon the shackles.

4. The combination as defined by claim 2, wherein said tensioning means comprises a single friction brake operative individually upon the shackles.

5. The combination as defined by claim 3, wherein is included in addition to said brake means, an animal support means intermediate said brake means and said forwarding conveyor, supplementing tensioning of the shackles.

6. The combination as defined by claim 1, wherein each shackle comprises a length of chain having at one end a noose for application to the hind leg, and a trolley at the opposite end of the chain adapted to ride upon said shackle supporting means.

7. The combination as defined in claim 6, wherein said tensioning means operates to maintain tension on the shackle chain to take up slack therein, from approximately the time of application of the shackle until transfer of the shackled animal to the forwarding conveyor, said tensioning means comprising an elongate pressure bar yieldingly contacting a portion of the trolley continuously throughout a portion of the trolley advancement upon said shackle supporting means.

8. The combination as defined by claim 7, wherein the shackle support means includes a trolley rail, and said pressure bar yieldingly frictionally engages said trolley portion.

9. The combination as defined by claim 8, wherein said trolley portion is frictionally embraced between the pressure bar and the trolley rail.

10. The combination as defined by claim 7, wherein the contact force of the pressure bar upon the trolley, is adjustable.

11. The combination as defined by claim 9, wherein is included means for adjusting the force of contact of the pressure bar upon said trolley portion.

12. The combination as defined by claim 8, wherein is included an elongate frictional wear strip carried by the trolley rail in position to be swept by the trolley portion aforesaid.

13. The combination as defined by claim 11, wherein is included an elongate frictional wear strip disposed along a face of the trolley rail in position to be swept by the trolley portion aforesaid.

14. The combination as defined by claim 6, wherein said forwarding conveyor is inclined upwardly from said tensioning means in position to receive and elevate shackles released by the tensioning means; and means associated with the inclined forwarding conveyor to resume tensioning of the shackles subsequently to release thereof from said tensioning means.

15. The combination as defined by claim 14, wherein said tensioning means comprises an elongate pressure bar yieldingly contacting a portion of the trolley during advancement of the trolley upon said shackle supporting means.

16. The combination as defined by claim 15, wherein is included means for adjusting the force of contact of the pressure bar upon said trolley portion.

17. Tensioning means for flexible animal shackles which are suspended by means of trolleys riding upon an elongate shackle rail, said tensioning means comprising: an elongate pressure bar; means supporting the pressure bar lengthwise of said rail in substantial parallelism therewith, said supporting means including yielding means for establishing frictional contact of said bar against a portion of the shackle trolley interposed between the rail and said elongate bar.

18. Tensioning means as defined by claim 17, wherein is included adjustable means for varying the force of contact of the pressure bar against said trolley portion.

19. Tensioning means as defined by claim 17, wherein is included an elongate frictional wear strip mounted upon the shackle rail in position to be wiped by said trolley portion.

20. Tensioning means as defined by claim 18, wherein opposite end portions of the pressure bar are subject to independent adjustment of the force of contact thereof upon said trolley portion.

21. Tensioning means as defined by claim 20, wherein is included an elongate frictional wear strip mounted upon the shackle rail in position to be wiped by said trolley portion.

22. Tensioning means as defined by claim 17, wherein is included adjustable means for equalizing the force of contact of said bar against said trolley portion along the full length of said bar.

* * * * *